United States Patent
Yang et al.

(10) Patent No.: US 11,765,573 B2
(45) Date of Patent: Sep. 19, 2023

(54) V2X ID MANAGEMENT FOR PERSISTENT CONNECTION

(71) Applicant: QUALCOMM Incorporated, San Diego, CA (US)

(72) Inventors: Seung Ryul Yang, San Diego, CA (US); Vincent Douglas Park, Alexandria, VA (US); Abolfazl Hajisami, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 17/202,759

(22) Filed: Mar. 16, 2021

(65) Prior Publication Data

US 2022/0303758 A1    Sep. 22, 2022

(51) Int. Cl.
*H04W 8/22* (2009.01)
*H04W 76/25* (2018.01)
*H04W 76/11* (2018.01)

(52) U.S. Cl.
CPC .............. *H04W 8/22* (2013.01); *H04W 76/11* (2018.02); *H04W 76/25* (2018.02)

(58) Field of Classification Search
CPC ....... H04W 4/46; H04W 76/11; H04W 76/25; H04W 76/14; H04W 8/22
See application file for complete search history.

(56) References Cited

U.S. PATENT DOCUMENTS

2020/0314928 A1* 10/2020 Kang .................... H04W 76/27

FOREIGN PATENT DOCUMENTS

| EP | 3723442 A1 * | 10/2020 | .......... H04L 5/0094 |
| EP | 3758433 A1 | 12/2020 | |
| EP | 3859709 A1 * | 8/2021 | |
| WO | WO-2021163507 A1 * | 8/2021 | |

OTHER PUBLICATIONS

Interdigital, et al., "Update of Link Identifier Update for Unicast Link Procedure", S2-2002019R101, SA WG2 Meeting #S2-137E, 3rd Generation Partnership Project (3GPP), Mobile Competence Centre, 650, Route Des Lucioles, F-06921 Sophia-Antipolis Cedex, France, vol. SA WG21 No. Electronic Meeting, Feb. 24, 2020-Feb. 27, 2020, Feb. 26, 2020, XP0518578731, 9 Pages, Paragraph [6 .3.3.2].
International Search Report and Written Opinion—PCT/US2022/017084—ISA/EPO—dated May 30, 2022.

* cited by examiner

*Primary Examiner* — Ricardo H Castaneyra
(74) *Attorney, Agent, or Firm* — Procopio, Cory, Hargreaves & Savitch LLP

(57) ABSTRACT

A configuration to allow for the suppression or delay of the changing of an ID of a first wireless device to maintain a connection with another wireless device. The apparatus establishes a connection with a second wireless device using a side link. An ID of a first wireless device is provided to the second wireless device. The apparatus determines to change the ID of the first wireless device based on a predetermined schedule. The apparatus initiates a suppression to change of the ID of the first wireless device to maintain the connection with the second wireless device.

27 Claims, 15 Drawing Sheets

700

702

ASN.1 Representation:
```
IDChangeSuppressionMessage ::= SEQUENCE {
   destinationVehicleIDs      SEQUENCE OF TemporaryID    OPTIONAL
   }
```

704

ASN.1 Representation:
```
IDChangeSuppressionFlag ::= BOOLEAN
-- "1" means that ID change of a receiving V2X entity
shall be suppressed.
-- "0" means that ID change of a receiving V2X entity
shall not be suppressed.

V2XMessage ::= SEQUENCE {
     ...
     idChangeSuppressionFlag    IDChangeSuppressionFlag
     ...
     }
```

706

ASN.1 Representation:
```
IDChangeSuppressionTarget ::= SEQUENCE {
   destinationVehicleIDs      SEQUENCE OF TemporaryID    OPTIONAL
   }

V2XMessage ::= SEQUENCE {
     ...
     idChangeSuppressionTarget      IDChangeSuppressionTarget
     ...
     }
```

```
ASN.1 Representation:
   IDChangeSuppressionMessage ::= SEQUENCE {
      destinationVehicleIDs      SEQUENCE OF TemporaryID    OPTIONAL,
      IDChangeSuppressionStartTime       Dsecond            OPTIONAL,
      IDChangeSuppressionEndTime         DSecond,
      }

ASN.1 Representation:
   IDChangeSuppressionMessage ::= SEQUENCE {
      destinationVehicleIDs      SEQUENCE OF TemporaryID    OPTIONAL
      IDChangeSuppressionStartTime       DSecond            OPTIONAL,
      IDChangeSuppressionDuration        DSecond,
      }
```

```
ASN.1 Representation:
   IDChangeSuppression ::= SEQUENCE {
      destinationVehicleIDs      SEQUENCE OF TemporaryID    OPTIONAL,
      IDChangeSuppressionStartTime   Dsecond    OPTIONAL,
      IDChangeSuppressionEndTime     DSecond,
      }

ASN.1 Representation:
   IDChangeSuppression ::= SEQUENCE {
      destinationVehicleIDs      SEQUENCE OF TemporaryID    OPTIONAL,
      IDChangeSuppressionStartTime   Dsecond    OPTIONAL,
      IDChangeSuppressionDuration    DSecond,
      }

V2XMessage ::= SEQUENCE {
         ...
         idChangeSuppression        IDChangeSuppression
         ...
         }
```

~ 904

906

```
ASN.1 Representation:
   IDChangeSuppressionEndMessage ::= SEQUENCE {
      destinationVehicleIDs      SEQUENCE OF TemporaryID    OPTIONAL,
      IDChangeSuppressionEndTime             Dsecond        OPTIONAL,
      }
```

908

```
ASN.1 Representation:
   IDChangeSuppressionEnd ::= SEQUENCE {
      destinationVehicleIDs      SEQUENCE OF TemporaryID    OPTIONAL,
       IDChangeSuppressionEndTime    Dsecond    OPTIONAL,
      }

V2XMessage ::= SEQUENCE {
         ...
         idChangeSuppressionEnd    IDChangeSuppressionEnd
         ...
         }
```

ASN.1 Representation:
```
IDChangeAnnounceMessage ::= SEQUENCE {
    sourceVehicleCurrentID    TemporaryID,
    sourceVehicleOldID        TemporaryID,
    }
```

1104

ASN.1 Representation:
```
IDChangeAnnounce ::= SEQUENCE {
    sourceVehicleCurrentID    TemporaryID,        OPTIONAL
    sourceVehicleOldID        TemporaryID,
    }

V2XMessage ::= SEQUENCE {
    ...
    IDChangeAnnounce          IDChangeAnnounce
    ...
    }
```

FIG. 11

V2X ID MANAGEMENT FOR PERSISTENT CONNECTION

BACKGROUND

Technical Field

The present disclosure relates generally to communication systems, and more particularly, to a configuration for vehicle-to-anything (V2X) identifier (ID) management for persistent connection.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as in V2X, V2V, and/or D2D communication. There exists a need for further improvements in V2X, V2V, and/or D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a first UE. The device may be a processor and/or a modem at a UE or the UE itself. The apparatus establishes a connection with a second wireless device using a side link, wherein an identifier (ID) of the first wireless device is provided to the second wireless device. The apparatus determines to change the ID of the first wireless device based on a predetermined schedule. The apparatus initiates a suppression of the change of the ID of the first wireless device to maintain the connection with the second wireless device.

In an aspect of the disclosure, a method, a computer-readable medium, and an apparatus are provided. The apparatus may be a device at a second UE. The device may be a processor and/or a modem at a UE or the UE itself. The apparatus establishes a connection with a first wireless device using a side link, wherein an identifier (ID) of the first wireless device is provided to the second wireless device. The apparatus determines to suppress a change of the ID of the first wireless device to maintain the connection with the first wireless device. The apparatus transmits an indication to suppress the change of the ID of the first wireless device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7 is a diagram illustrating an example of a message format.

FIG. 9 is a diagram illustrating an example of a message format.

FIG. 11 is a diagram illustrating an example of a message format.

DETAILED DESCRIPTION

Figure 1:
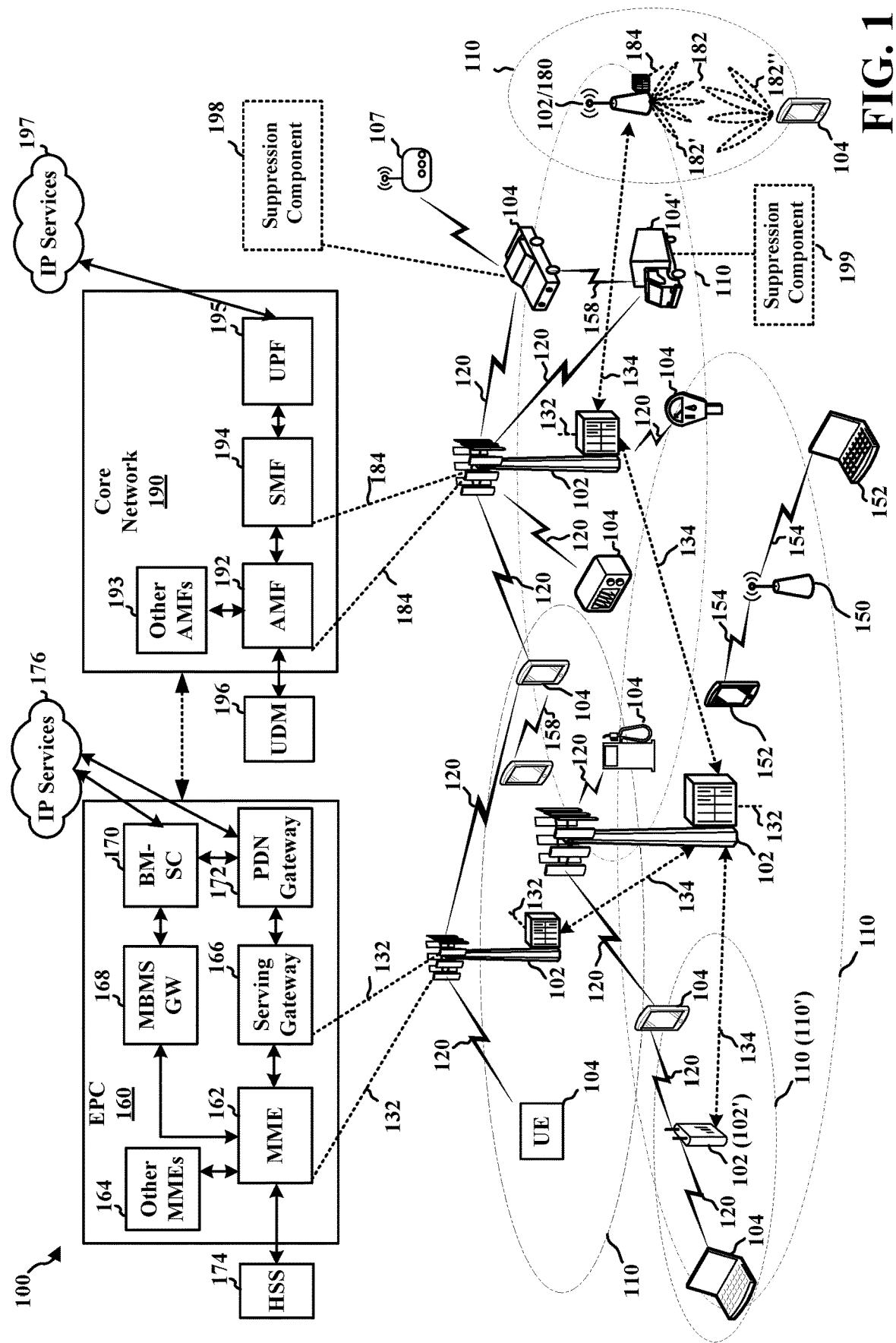
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to YMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on sidelink communication such as V2X or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), cellular-vehicle-to everything (C-V2X), enhanced V2X (e-V2X), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. Communication based on V2X and/or D2D communication may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

Referring again to FIG. 1, in certain aspects, the UE 104 may be configured to suppress or delay the changing of the ID of the UE 104 to maintain a connection with another wireless device. For example, the UE 104 may comprise a suppression component 198 configured to suppress or delay the changing of the ID of the UE 104 to maintain the connection with another wireless device (e.g., UE 104'). The UE 104 may establish a connection with a second wireless device using a side link. An ID of the UE 104 may be provided to the second wireless device. The UE 104 may determine to change the ID of the UE 104 based on a predetermined schedule. The UE 104 may initiate a suppression of the change of the ID of the first wireless device to maintain the connection with the second wireless device.

Referring again to FIG. 1, in certain aspects, the UE 104' may be configured to instruct a first wireless device (e.g., UE 104) to suppress or delay the changing of the ID of the first wireless device to maintain a connection between the first wireless device and UE 104'. For example, UE 104' may comprise a suppression component 199 configured to instruct the UE 104 to suppress or delay the changing of the ID of the UE 104 to maintain a connection between the first wireless device and UE 104'. The UE 104' may establish a connection with the UE 104 using a side link. An identifier of the UE 104 may be provided to the UE 104'. The UE 104' may determine to suppress a change of the ID of the UE 104 to maintain the connection with the UE 104. The UE 104' may transmit an indication to suppress the change of the ID of the UE 104.

Although the following description may be focused on 5G NR, the concepts described herein may be applicable to other similar areas, such as LTE, LTE-A, CDMA, GSM, and other wireless technologies.

Figure 2:
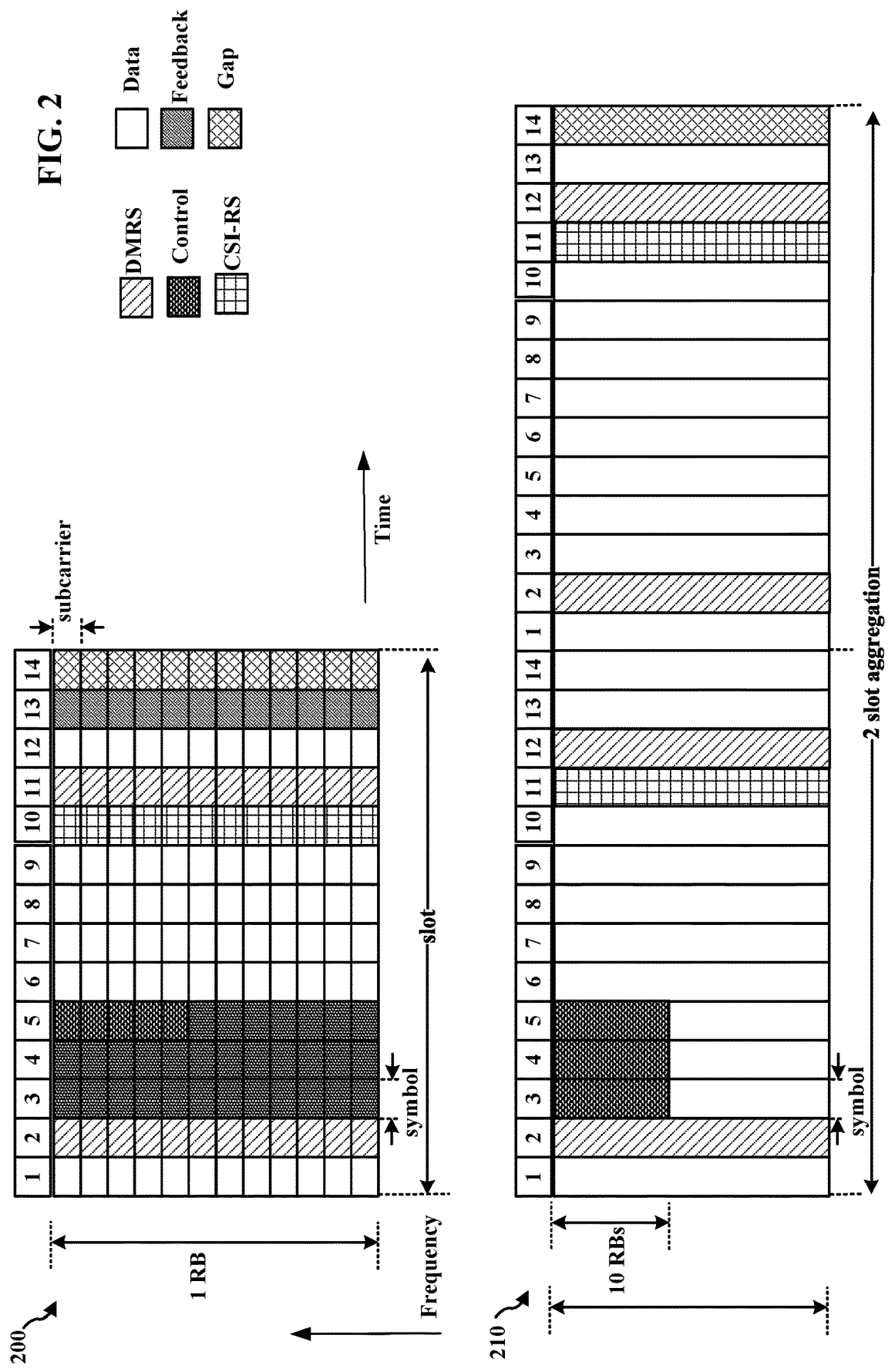
FIG. 2 illustrate example aspects of a sidelink slot structure.

FIG. 2 illustrates an example diagram 200 illustrating a sidelink subframe within a frame structure that may be used for sidelink communication, e.g., between UEs 104, between a UE and infrastructure, between a UE and an RSU, etc. The frame structure may be within an LTE frame structure. Although the following description may be focused on LTE, the concepts described herein may be applicable to other similar areas, such as 5G NR, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include two slots. Each slot may include 7 SC-FDMA symbols. For slot configuration 0, each slot may include 14 symbols, and for slot configuration 1, each slot may include 7 symbols. Although the diagram 200 illustrates a single RB subframe, the sidelink communication may include multiple RBs.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include a reference signal, such as a demodulation RS (DMRS). At least one symbol may be used for feedback, as described herein. A symbol prior to and/or after the feedback may be used for turnaround between reception of data and transmission of the feedback. Another symbol, e.g., at the end of the subframe may be used as a guard symbol without transmission/reception. The guard enables a device to switch from operating as a transmitting device to prepare to operate as a receiving device, e.g., in the following subframe. Data or control may be transmitted in the remaining REs, as illustrated. For example, data may be carried in a PSSCH, and the control information may be carried in a PSCCH. The control information may comprise Sidelink Control Information (SCI). The position of any of the reference signals, control, and data may be different than the example illustrated in FIG. 2.

FIG. 2 merely illustrates one, non-limiting example of a frame structure that may be used. Aspects described herein may be applied to communication using other, different frame formats.

Figure 3:
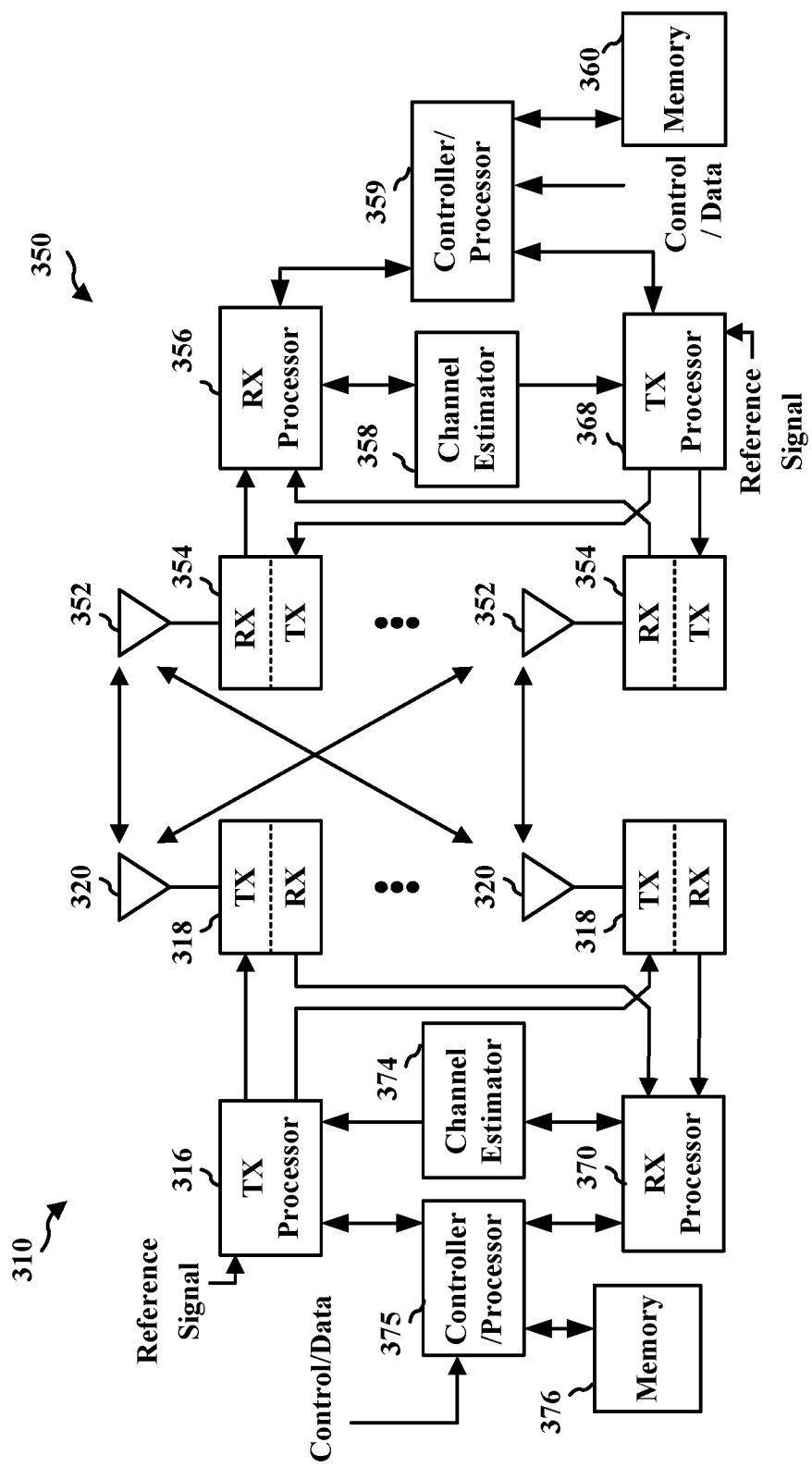
FIG. 3 is a diagram illustrating an example of a first device and a second device involved in wireless communication based, e.g., on V2V, V2X, and/or device-to-device communication.

FIG. 3 is a block diagram of a first wireless communication device 310 in communication with a second wireless communication device 350, e.g., via V2V/V2X/other communication. The device 310 may comprise a transmitting device communicating with a receiving device, e.g., device 350. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 or 199 of FIG. 1.

Figure 4:
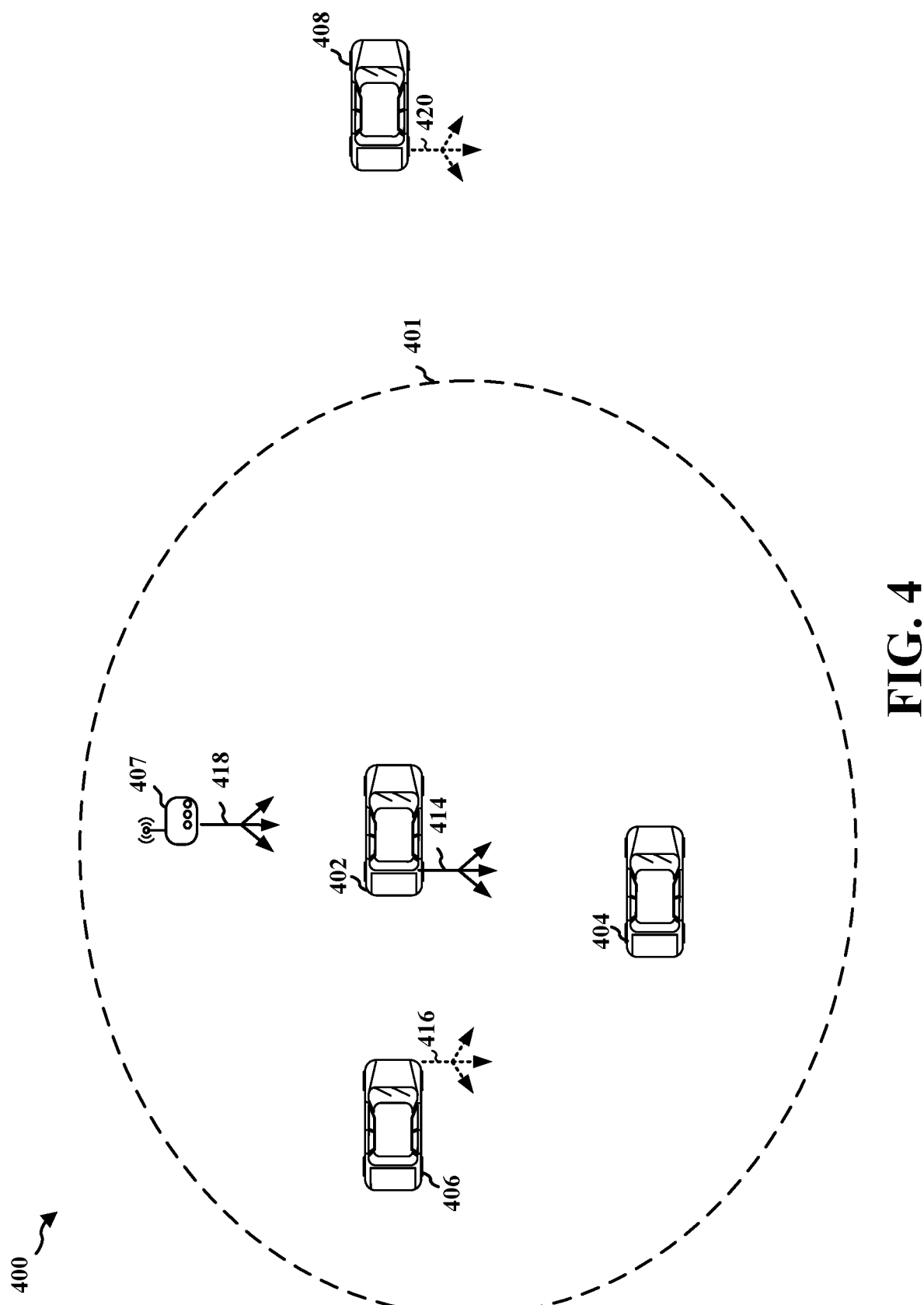
FIG. 4 is a diagram illustrating an example of a first device and a second device involved in wireless communication based, e.g., on sidelink communication.

FIG. 4 illustrates an example 400 of wireless communication between devices based on sidelink communication, such as V2X or other D2D communication. The communication may be based on a slot structure comprising aspects described in connection with FIG. 2. For example, transmitting UE 402 may transmit a transmission 414, e.g., comprising a control channel and/or a corresponding data channel, that may be received by receiving UEs 404, 406, 408. At least one UE may comprise an autonomous vehicle or an unmanned aerial vehicle. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 402, 404, 406, 408 may each be capable of operating as a transmitting device in addition to operating as a receiving device. Thus, UEs 406, 408 are illustrated as transmitting transmissions 416, 420. The transmissions 414, 416, 420 may be broadcast or multicast to nearby devices. For example, UE 414 may transmit communication intended for receipt by other UEs within a range 401 of UE 414. Additionally/alternatively, RSU 407 may receive communication from and/or transmit communication to UEs 402, 404, 406, 408.

UE 402, 404, 406, 408 or RSU 407 may comprise a suppression component, similar to 198 or 199 described in connection with FIG. 1.

In wireless communications, such as V2X communications, a V2X entity may have a security certificate in order to protect privacy. The security certificate may change periodically, such as every certain length of time. Messages sent by a V2X entity may contain identifications related to the V2X entity. For example, the messages may include identifications related to upper layers, such as an application layer identifier, or related to lower layers, such as layer 2 (L2) identifiers. The identifications may be randomized and/or changed whenever the certificate is changed, such that other V2X entities are not able to continuously track a V2X entity.

Figure 5:
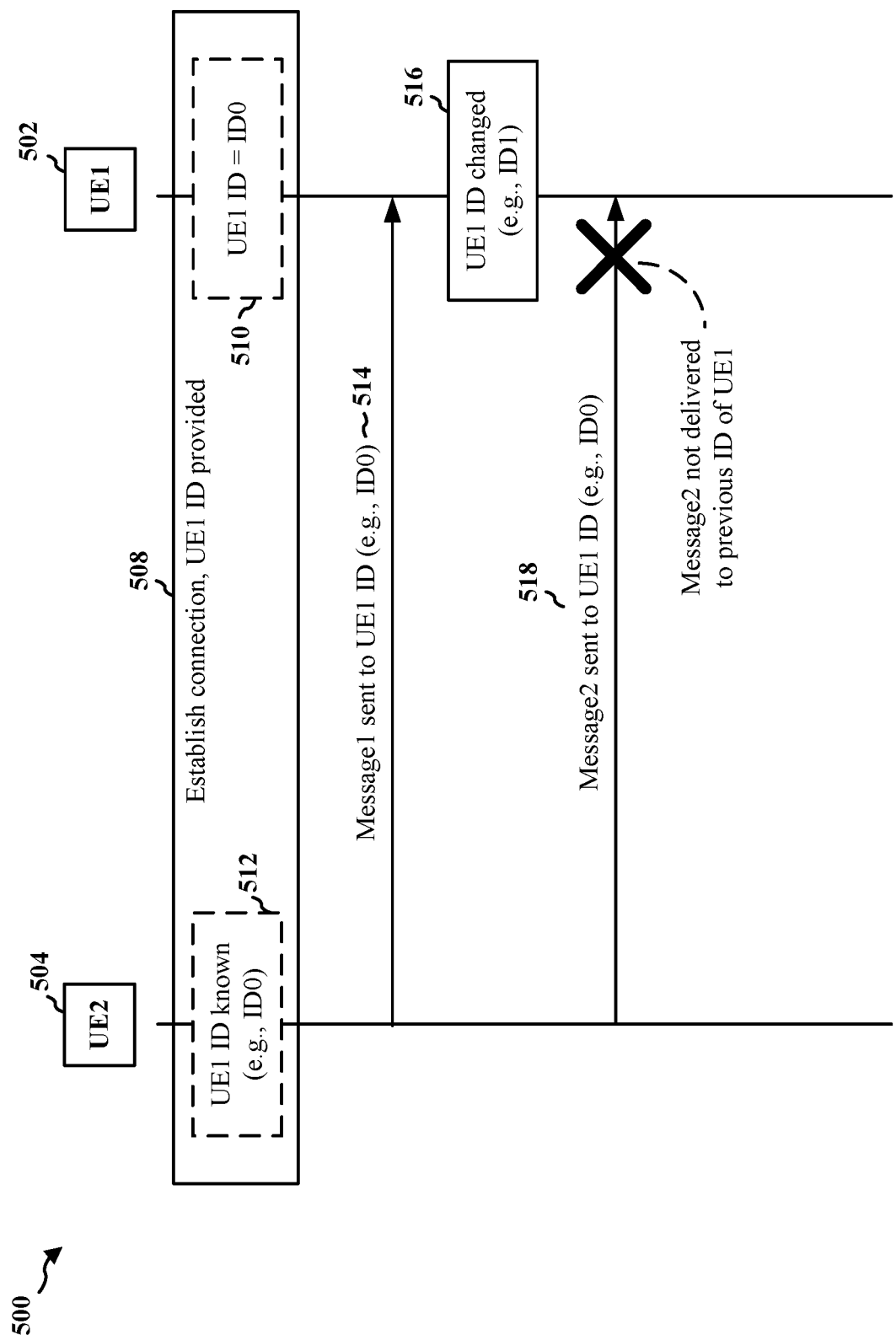
FIG. 5 is a diagram illustrating an example of side link communication between a first wireless device and a second wireless device.

FIG. 5 is a diagram 500 illustrating an example of side link communication between a first wireless device UE1 502 and a second wireless device UE2 504. The first wireless device UE1 502 and/or the second wireless device UE2 504 may be V2X entities communicating with each other over a side link. At 508, the UE1 502 and UE2 504 may engage in a procedure to establish a side link connection between each other. The ID of the UE1 502 may be provided to the UE2 504, for example, during the connection procedure. Providing the ID of the UE1 502 to the UE2 504 allows the UE2 504 to transmit messages addressed to the ID of the UE1 502, such that the UE1 502 may properly receive and process the message. For example, UE1 502 may have an ID 510 of ID0 which is provided to UE2 504, at 512. At 514, the UE2 504 transmits a first message to the UE1 502 targeted to the ID provided (e.g., ID0). However, as discussed above, the ID of V2X entities may be changed such that other V2X entities are not continuously tracking another V2X entity. As such, at 516, the UE1 502 may determine to change its ID. However, UE2 504 is unaware of the change of the ID of UE1 502, and may continue to transmit messages to UE1 502 addressed to the ID it was provided (e.g., ID0). For example, at 518, the UE2 504 may send a second message addressed to the same ID as provided and as in the first message. However, the UE2 504 is not aware of the change of ID of the UE1 502, as such, the second message sent to the previous ID of UE1 502 will not be properly delivered to UE1 502.

In some instances, some applications may need for a V2X entity (e.g., a V2X transmitter) to deliver a message to a specific V2X entity (e.g., a V2X receiver) by using a previously known ID of the V2X receiver. In such instances, if the ID of the V2X receiver has changed before the V2X transmitter transmits the message, then the message will be sent or targeted with the previous ID of the V2X receiver. As such, the message will not be successfully delivered to the V2X receiver. This situation may occur in instances where one or more V2X entities attempt to deliver a message to one or more V2X entities by using their IDs.

Aspects provided herein provide a configuration for V2X ID management for a persistent connection. For example, a first wireless device may be configured to suppress or delay the changing of the ID of the first wireless device to maintain a connection with another wireless device. Suppression of the change of the ID of the first wireless device may allow the first wireless device to prolong or maintain the connection with another wireless device in order to allow for the another wireless device to transmit data to the first wireless device using the previous ID of the first wireless device. The suppression of the change of the ID of the first wireless device may be initiated by the first wireless device or another wireless device.

Figure 6:
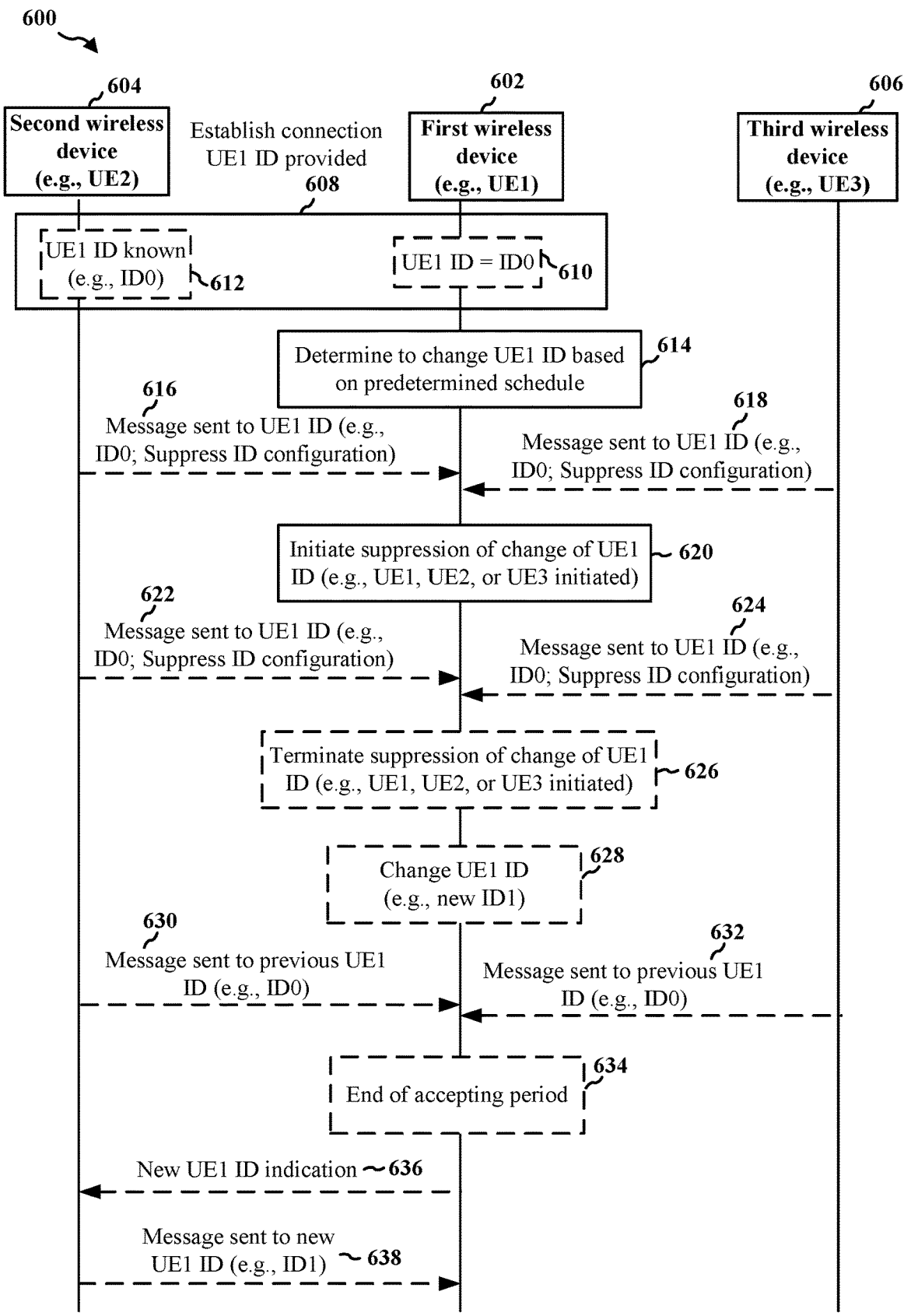
FIG. 6 is a call flow diagram of signaling between a first wireless device and a second wireless device.

FIG. 6 is a call flow diagram 600 of signaling between a first wireless device UE1 602, a second wireless device UE2 604, and a third wireless device UE3 606. The UE1 602 may be configured to communicate with the UE2 604 and/or the UE3 606. The first wireless device UE1 602, the second wireless device UE2 604, and/or the third wireless device UE3 606 may be V2X entities communicating with each other over a side link. For example, in the context of FIG. 1, the UE1 602 may correspond to at least UE 104, while the UE2 604 and/or UE3 606 may correspond to at least UE 104'. In another example, in the context of FIG. 3, UE1 602, UE2 604, and/or UE3 606 may correspond to UE 350. Optional aspects are illustrated with a dashed line.

As illustrated at 608, the UE1 602 and UE2 604 may engage in a procedure to establish a side link connection between each other. The ID of the UE1 602 may be provided to the UE2 604, for example, during the connection procedure. Providing the ID of the UE1 602 to the UE2 604 allows the UE2 604 to transmit messages addressed to the ID of the UE1 602, such that the UE1 602 may properly receive and process the message. For example, UE1 602 may have an ID 610 of ID0 which is provided to UE2 604, at 612.

As illustrated at 614, the UE1 602 may determine to change the ID of the UE1 602.

The UE1 602 may determine to change the ID of the UE1 602 based on a predetermined schedule. In some aspects, the predetermined schedule may be based on a period of time. The ID of UE1 602 changes for security purposes such that the UE1 602 may prevent other wireless devices from continuously tracking UE1 602.

In some aspects, for example as illustrated at 616, the UE1 602 may receive an indication to suppress the change of the ID of the UE1 602. The UE1 602 may receive the indication to suppress the change of the ID of the UE1 602 from the UE2 604. In some aspects, for example as illustrated at 618, the UE1 602 may receive, from a UE3 606, an indication to suppress the change of the ID of the UE1 602. In some aspects, a message (e.g., 616, 618) from UE2 or UE3 may include an ID suppression configuration that comprises an indication to suppress the change of the ID of the UE1.

Figure 8:
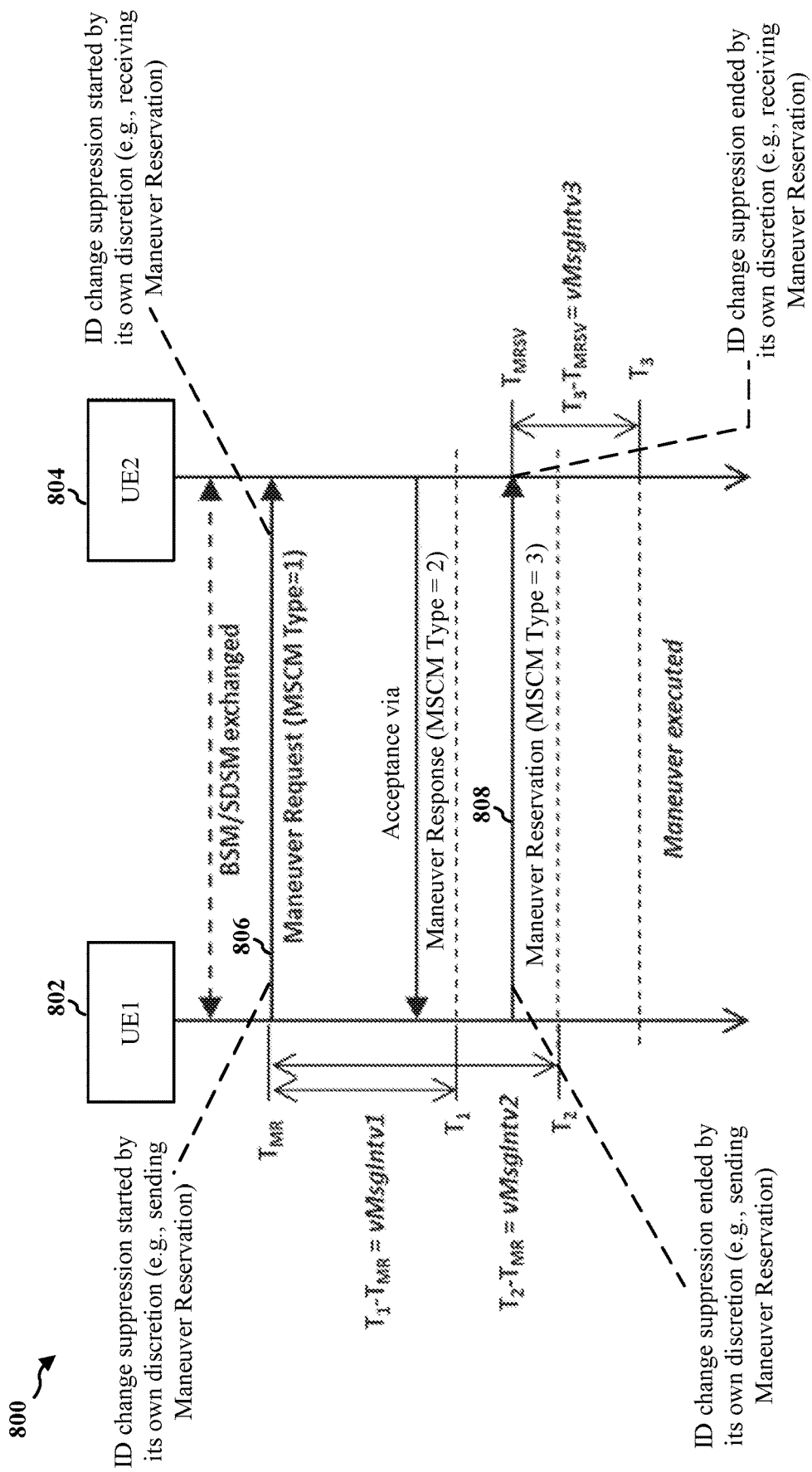
FIG. 8 is a diagram illustrating a suppression termination procedure.

As illustrated at 620, the UE1 602 may initiate a suppression of a change of the ID of the UE1 602. The UE1 602 may initiate the suppression of the change of the ID of the UE1 602 to maintain the connection with at least the UE2 604. In some aspects, the UE1 602 may initiate the suppression of the change of the ID of the UE1 602, such that the UE1 602 determines on its own that the change of the ID is to be suppressed. In some aspects, the UE1 602 may initiate the suppression of the change of the ID of the UE1 602 in response to transmission of a maneuver sharing and coordinating message (MSCM) to at least the UE2 604. For example, with reference to diagram 800 of FIG. 8, the UE1 802 may initiate suppression of the change of its ID by sending a maneuver reservation 806 to the UE2 804. The ID change suppression of UE1 802 may be started when the UE1 802 sends the MSCM with the message type of 1 (e.g., maneuver request) to at least the UE2 804. In some aspects, the ID change suppression of UE2 804 may be started when the UE2 804 receives the MSCM with the message type of 1 (e.g., maneuver request) from the UE1 802. In some aspects, the UE1 602 may initiate the suppression of the change of the ID of the UE1 602 in response to receiving an indication to suppress the change of the ID of the UE1 602 from the UE2 604. In some aspects, the UE1 602 may initiate the suppression of the change of the ID of the UE1 602 in response to receiving an indication to suppress the change of the ID of the UE1 602 from a UE3 606, other than the UE2 604. For example, the message 616 from UE2 604 or the message 618 from UE3 606 may include the ID suppression configuration that includes the indication to start the suppression of the change of the ID of the UE1 602. With reference to diagram 700 of FIG. 7, the message 702 may comprise a separated message that includes the ID suppression configuration. The data elements 704 and 706 may comprise the ID suppression configuration that may be added into any message.

In some aspects, for example as illustrated at 626, the UE1 602 may terminate the suppression of the change of the ID of the UE1 602. For example, the first wireless device UE1 602 may determine on its own to terminate the suppression of the change of the ID of the UE1 602. In some aspects, to terminate the suppression of the change of the ID of the UE1 602, the UE1 602 may receive a termination indication. The UE1 602 may receive the termination indication from the UE2 604 or the UE3 606. The termination indication may instruct the UE1 602 to terminate the suppression of the change of the ID of the UE1 602. In some aspects, the termination indication may provide a suppression duration. For example, the termination indication may be received within an indication to initiate the suppression to the change of the ID or may be received in a separate transmission after the indication to initiate the suppression to the change of the ID. For example, the suppression ID configuration of message 616 and/or 618 may include instructions to start and end the suppression of the change of the ID of UE1 602. With reference to the diagram 900 of FIG. 9, the message 902 may comprise the suppression ID configuration that provides instructions to start and end the suppression of the change of the ID of the UE1 602. In some aspects, the data element 904 may comprise the suppression ID configuration that may be added into any message, wherein the suppression ID configuration provides instructions to start and end the suppression of the change of the ID of the UE1 602. In some aspects, the UE1 602 may receive the termination indication from the UE2 604 in the message 622, wherein the termination indication is separate from the indication to initiate the suppression. The message 622 may include the suppression ID configuration which may provide instructions to terminate the suppression of the change of the ID of the UE1 602. In some aspects, the UE1 602 may receive the termination indication from the UE3 606 in the message 624. The message 624 may include the suppression ID configuration which may provide instructions to terminate the suppression of the change of the ID of the UE1 602. With reference to the diagram 900 of FIG. 9, the message 906 may comprise a separated message that includes the ID suppression configuration, wherein the message 906 provides instructions to terminate the suppression of the change of the ID. In some aspects, the data element 908 may comprise the ID suppression configuration that may be added into any message that provides instructions to terminate the suppression of the change of the ID. In some aspects, the UE1 602 may receive a first message from the UE2 604 to start the suppression of the change of the ID of the UE1 602, and a second message separate from the first message to terminate the suppression of the change of the ID of the UE1 602. The UE1 602 may receive separate messages to start and terminate the suppression of the change of the ID of the UE1 602 from the UE3 606 or another wireless device. In some aspects, the UE1 602 may terminate the suppression of the change of the ID of the UE1 602 based on an occurrence of an event. In some aspects, the termination of the suppression of the change of the ID of the UE1 602 may be triggered in response to transmission or reception of a maneuver sharing and coordinating message (MSCM) message having a maneuver reservation. The termination of the suppression of the change of the ID may occur upon execution of a maneuver associated with the maneuver reservation. For example, with reference to FIG. 8, suppression of the change of the ID of UE1 802 may be terminated by the UE1 802 by sending, at 808, the maneuver reservation MSCM type 3 message to the UE2 804. In some aspects, the suppression of the change of the ID of UE1 802 may be terminated by UE2 804 receiving, at 808, the maneuver reservation MSCM type 3 message from the UE1 802.

In some aspects, for example as illustrated at 628, the UE1 602 may change the ID of the UE1 602. The UE1 602 may change the ID after the suppression to the change of the ID has terminated. For example, the first wireless device UE1 602 may change the ID, at 628, to a new ID. The UE1 602 may initiate an accepting period, wherein the UE1 602 may accept messages addressed to the previous ID of the UE1 602.

Figure 10:
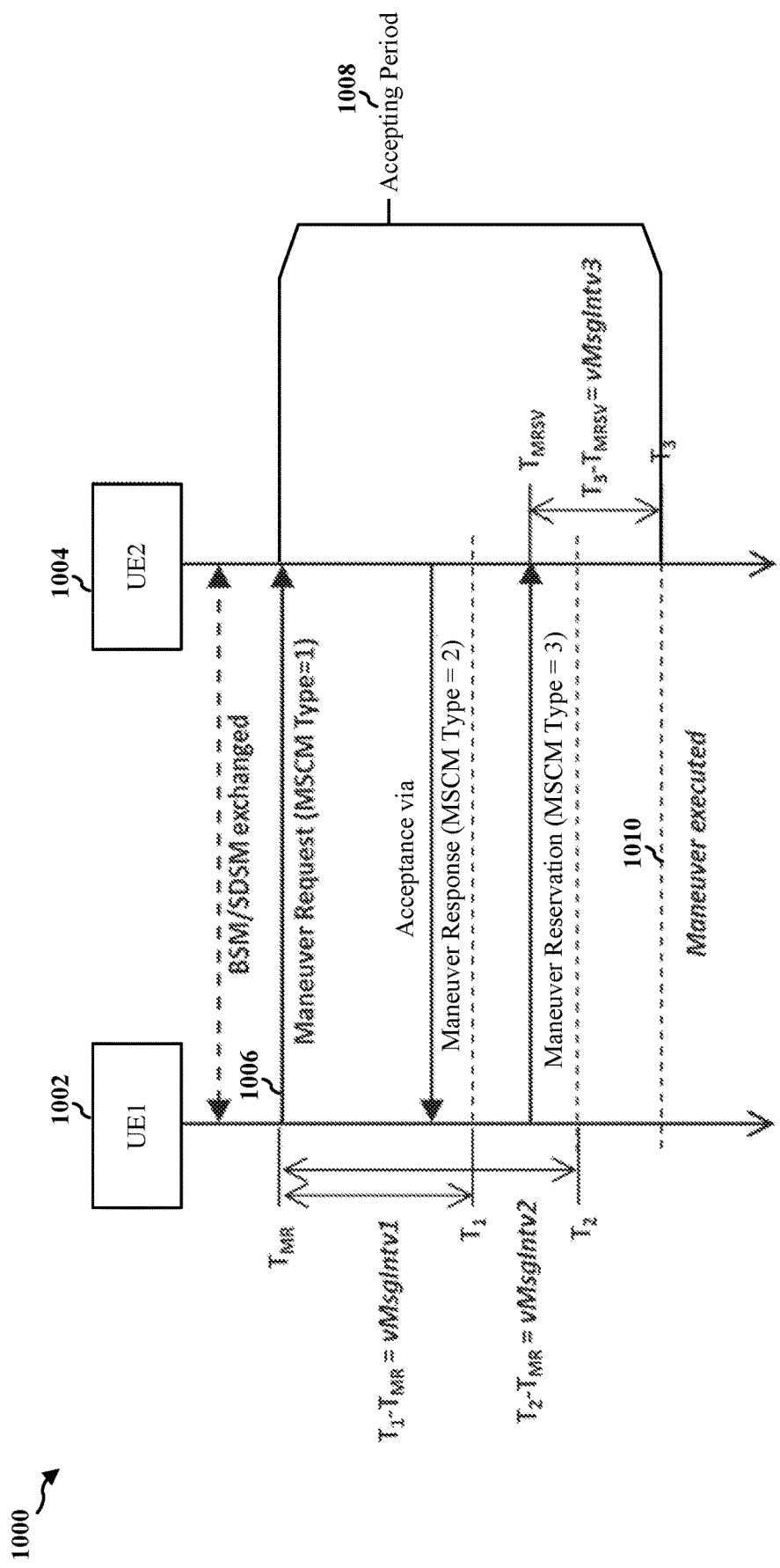
FIG. 10 is a diagram illustrating an accepting period procedure.

In some aspects, for example as illustrated at 630, the UE1 602 may receive a message targeted to a previous ID of the UE1 602. The UE1 602 may receive the message targeted to the previous ID of the UE1 602 after the changing of the ID. The UE1 602 may receive the message targeted to the previous ID of the UE2 604 or the UE3 606. The UE1 602 may accept the message targeted to the previous ID of the UE1 602. For example, the UE1 602 may receive the message 630 that is sent, from the UE2 604, to the previous ID of the UE1 602. In some aspects, the UE1 602 may receive the message 632 that is sent, from the UE3 606, to the previous ID of the UE1 602. The UE1 602 may accept the message 630 or 632 that is sent or targeted to the previous ID of the UE1 602. In some aspects, the UE1 602 may accept the message targeted to the previous ID of the first device for the accepting period. The UE1 602 may also accept messages targeted to a new ID during the accepting period. The accepting period may be based at least on one of a length of time, a time instance, or based on an occurrence of an event. In some aspects, the accepting period may start when a maneuver request is sent or received by the first wireless device. For example, with reference to diagram 1000 of FIG. 10, the UE1 1002 may send, at 1006, a maneuver request message (e.g., MSCM type 1) to the UE2 1004. The transmission of the maneuver request message, at 1006, may start the accepting period 1008. The accepting period 1008 may end when the maneuver (e.g., 1010) associated with the maneuver reservation message has been performed. In some aspects, the accepting period may end upon execution of a maneuver associated with the maneuver request. In some aspects, the first wireless device may stop accepting the message targeted to the previous ID upon termination of the accepting period. In some aspects, the first wireless device may accept the message targeted to the previous ID of the first wireless device from the second wireless device based on the second wireless device having an established connection with the first wireless device while the ID of the first wireless device was the previous ID. The accepting period may end, as illustrated at 634.

In some aspects, for example as illustrated at 636, the UE1 602 may transmit a new ID indication indicating the change of the ID of the UE1 602 to a new ID. The UE1 602 may transmit the new ID indication indicating the change of the ID of the UE1 602 to at least a second wireless device. For example, the UE1 602 may transmit, at 636, an indication of a new ID to the UE2 604. In some aspects, the new ID indication may be transmitted to the UE2 604 based on the UE2 604 having an active connection with the UE1 602 prior to the change of the ID of the UE1 602. For example, with reference to diagram 1100 of FIG. 11, the message 1102 may be a separate message that includes the new ID indication indicating the change of the ID of the first wireless device. The message may be sent to one or more V2X entities and may be controlled by lower layer functionality. The message may be a broadcast message to V2X entities in a certain range of the UE1. The message may be a groupcast message to V2X entities in a certain group of V2X entities. The message may be a unicast message and sent to a targeted single V2X entity. In some aspects, the data element 1104 may be added into any message to provide the new ID indication.

In some aspects, for example as illustrated at 638, the UE1 602 may receive a new message targeted to the new ID of the UE1 602. The UE1 602 may receive the new message targeted to the new ID from the UE2 604. For example, the UE1 602 may receive, at 638, a message sent from the UE2 604 to a new ID of the UE1 602.

Figure 12:
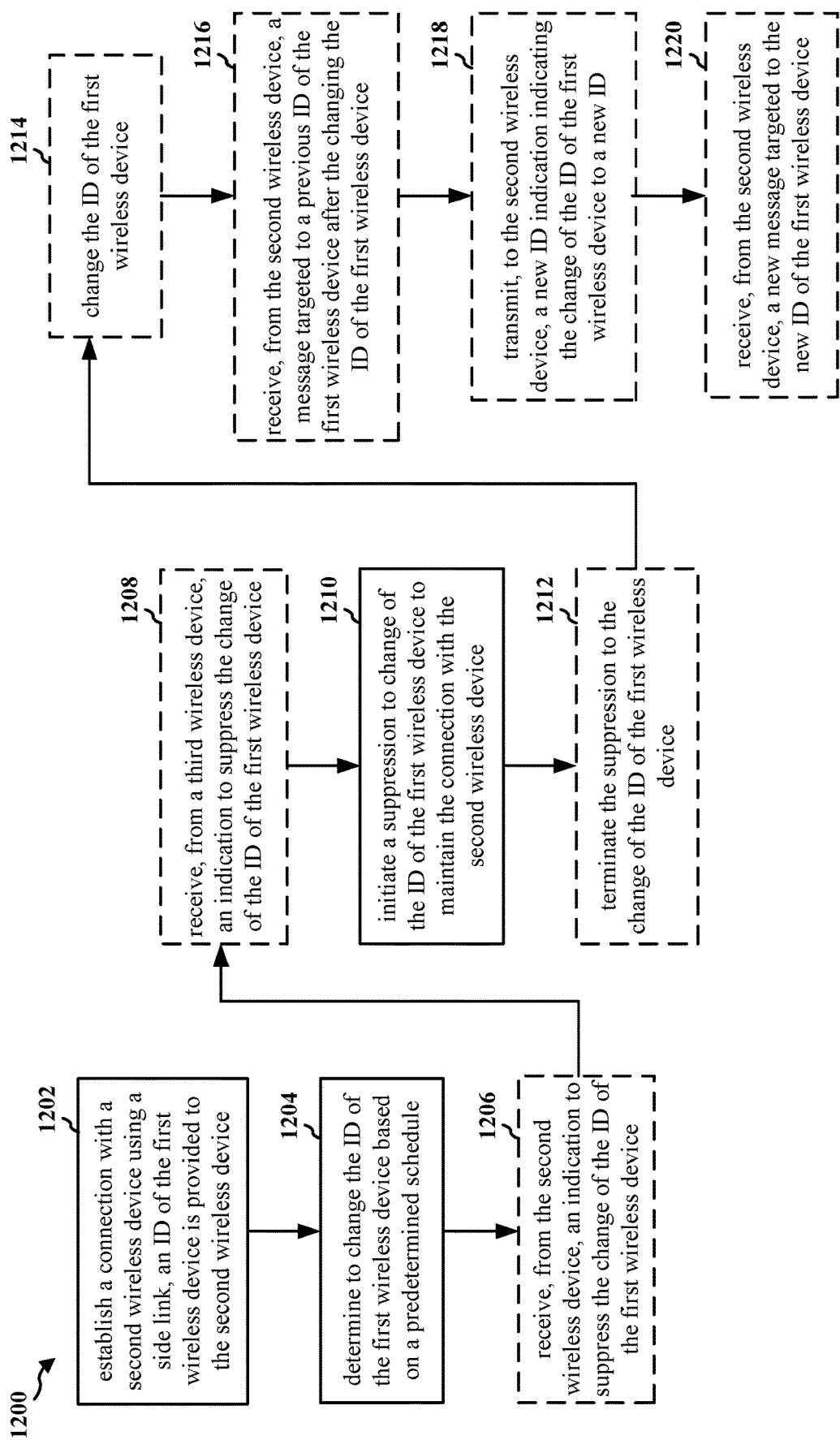
FIG. 12 is a flowchart of a method of wireless communication.

FIG. 12 is a flowchart 1200 of a method of wireless communication. The method may be performed by a UE or a component of a UE (e.g., the UE 104, 402, 404, 406, 408, 502, 602, 802, 1002; the apparatus 1302; the cellular baseband processor 1304, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may allow a first wireless device to suppress or delay the changing of the ID of the first wireless device to maintain a connection with another wireless device.

At 1202, the first wireless device may establish a connection with a second wireless device. For example, 1202 may be performed by connection component 1340 of apparatus 1302. The first wireless device may establish the connection with the second wireless device using a side link. An ID of the first wireless device may be provided to the second wireless device. The ID of the first wireless device may be provided to the second wireless device during a procedure to establish the connection. In the context of FIG. 6, the first wireless device UE1 602, at 608, establishes a connection with the second wireless device UE2 604. The ID of the first wireless device UE1 602 may be provided to the second wireless device UE2 604 during the procedure to establish the connection with the second wireless device UE2 604.

At 1204, the first wireless device may determine to change the ID of the first wireless device. For example, 1204 may be performed by determination component 1342 of apparatus 1302. The first wireless device may determine to change the ID of the first wireless device based on a predetermined schedule. In some aspects, the predetermined schedule may be based on a period of time. In the context of FIG. 6, the first wireless device UE1 602 may, at 614, determine to change its ID based on a predetermined schedule.

In some aspects, for example at 1206, the first wireless device may receive an indication to suppress the change of the ID of the first wireless device. For example, 1206 may be performed by suppression component 1344 of apparatus 1302. The first wireless device may receive the indication to suppress the change of the ID of the first wireless device from the second wireless device. In the context of FIG. 6, the first wireless device UE1 602 may receive, at 616, a message from the second wireless device UE2 604 that may include an ID suppression configuration that comprises an indication to suppress the change of the ID of the first wireless device.

In some aspects, for example at 1208, the first wireless device may receive, from a third wireless device, an indication to suppress the change of the ID of the first wireless device. For example, 1208 may be performed by suppression component 1344 of apparatus 1302. In the context of FIG. 6, the first wireless device UE1 602 may receive, at 618, a message from the third wireless device UE3 606 that may include an ID suppression configuration that comprises an indication to suppress the change of the ID of the first wireless device.

At 1210, the first wireless device may initiate a suppression of a change of the ID of the first wireless device. For example, 1210 may be performed by suppression component 1344 of apparatus 1302. The wireless device may initiate the suppression of the change of the ID of the first wireless device to maintain the connection with at least the second wireless device. In the context of FIG. 6, the first wireless device UE1 602 may, at 620, initiate suppression of the change of the ID of the first wireless device UE1 602. In some aspects, the first wireless device may initiate the suppression of the change of the ID of the first wireless device, such that the first wireless device determines on its own that the change of the ID is to be suppressed. In some aspects, the first wireless device may initiate the suppression of the change of the ID of the first wireless device in response to transmission of a maneuver sharing and coordinating message (MSCM) to at least the second wireless device. In some aspects, the first wireless device may initiate the suppression of the change of the ID of the first wireless device in response to receiving an indication to suppress the change of the ID of the first wireless device from the second wireless device. In some aspects, the first wireless device may initiate the suppression of the change of the ID of the first wireless device in response to receiving an indication to suppress the change of the ID of the first wireless device from a third wireless device, other than the second wireless device.

In some aspects, for example at 1212, the first wireless device may terminate the suppression of the change of the ID of the first wireless device. For example, 1212 may be performed by suppression component 1344 of apparatus 1302. In the context of FIG. 6, the first wireless device UE1 602 may terminate, at 626, the suppression of the change of the ID of the first wireless device UE1 602. In some aspects, to terminate the suppression of the change of the ID of the first wireless device, the first wireless device may receive a termination indication. The first wireless device may receive the termination indication from the second wireless device or the third wireless device. The termination indication may instruct the first wireless device to terminate the suppression of the change of the ID of the first wireless device. In some aspects, the termination indication may provide a suppression duration. For example, the termination indication may be received within an indication to initiate the suppression to the change of the ID or may be received in a separate transmission after the indication to initiate the suppression to the change of the ID. In the context of FIG. 6, the first wireless device UE1 602 may receive the termination indication from the second wireless device UE2 604 in the message 622. The message 622 may include the suppression ID configuration which may provide instructions to start and terminate the suppression of the change of the ID of the first wireless device. Further in the context of FIG. 6, the first wireless device UE1 602 may receive the termination indication from the third wireless device UE3 606 in the message 624. The message 624 may include the suppression ID configuration which may provide instructions to start and terminate the suppression of the change of the ID of the first wireless device. In some aspects, the first wireless device may receive a first message from the second wireless device to start the suppression of the change of the ID of the first wireless device, and a second message separate from the first message to terminate the suppression of the change of the ID of the first wireless device. The first wireless device may receive separate messages to start and terminate the suppression of the change of the ID of the first wireless device from the third wireless device or another wireless device. In some aspects, the first wireless device may terminate the suppression of the change of the ID of the first wireless device based on an occurrence of an event. In some aspects, the termination of the suppression of the change of the ID of the first wireless device may be triggered in response to transmission or reception of a maneuver sharing and coordinating message (MSCM) message having a maneuver reservation. The termination of the suppression of the change of the ID may occur upon execution of a maneuver associated with the maneuver reservation.

In some aspects, for example at 1214, the first wireless device may change the ID of the first wireless device. For example, 1214 may be performed by ID component 1346 of apparatus 1302. The first wireless device may change the ID after the suppression to the change of the ID has terminated. In the context of FIG. 6, the first wireless device UE1 602 may change the ID, at 628, to a new ID.

In some aspects, for example at 1216, the first wireless device may receive a message targeted to a previous ID of the first wireless device. For example, 1216 may be performed by ID component 1346 of apparatus 1302. The first wireless device may receive the message targeted to the previous ID of the first wireless device after changing the ID of the first wireless device. The first wireless device may receive the message targeted to the previous ID of the first wireless device from the second wireless device or the third wireless device. The first wireless device may accept the message targeted to the previous ID of the first wireless device. In the context of FIG. 6, the first wireless device UE1 602 may receive the message 630 that is sent, from the second wireless device UE2 604, to the previous ID of the first wireless device UE1 602. Further in the context of FIG. 6, the first wireless device UE1 602 may receive the message 632 that is sent, from the third wireless device UE3 606, to the previous ID of the first wireless device UE1 602. The first wireless device UE1 602 may accept the message 630 or 632 that is sent or targeted to the previous ID of the first wireless device UE1 602. In some aspects, the first wireless device may accept the message targeted to the previous ID of the first device for an accepting period. The first wireless device may also accept messages targeted to a new ID during the accepting period. The accepting period may be based at least on one of a length of time, a time instance, or based on an occurrence of an event. In some aspects, the accepting period may start when a maneuver request is sent or received by the first wireless device. In some aspects, the accepting period may end upon execution of a maneuver associated with the maneuver request. In some aspects, the first wireless device may stop accepting the message targeted to the previous ID upon termination of the accepting period. In some aspects, the first wireless device may accept the message targeted to the previous ID of the first wireless device from the second wireless device based on the second wireless device having an established connection with the first wireless device while the ID of the first wireless device was the previous ID.

In some aspects, for example at 1218, the first wireless device may transmit a new ID indication indicating the change of the ID of the first wireless device to a new ID. For example, 1218 may be performed by ID component 1346 of apparatus 1302. The first wireless device may transmit the new ID indication indicating the change of the ID of the first wireless device to the second wireless device. In the context of FIG. 6, the first wireless device UE1 602 may transmit, at 636, an indication of a new ID to the second wireless device UE2 604. In some aspects, the new ID indication may be transmitted to the second wireless device based on the second wireless device having an active connection with the first wireless device prior to the change of the ID of the first wireless device.

In some aspects, for example at 1220, the first wireless device may receive a new message targeted to the new ID of the first wireless device. For example, 1220 may be performed by ID component 1346 of apparatus 1302. The first wireless device may receive the new message targeted to the new ID from the second wireless device. In the context of FIG. 6, the first wireless device UE1 602 may receive, at 638, a message sent from the second wireless device UE2 604 to a new ID of the first wireless device UE1 602.

Figure 13:
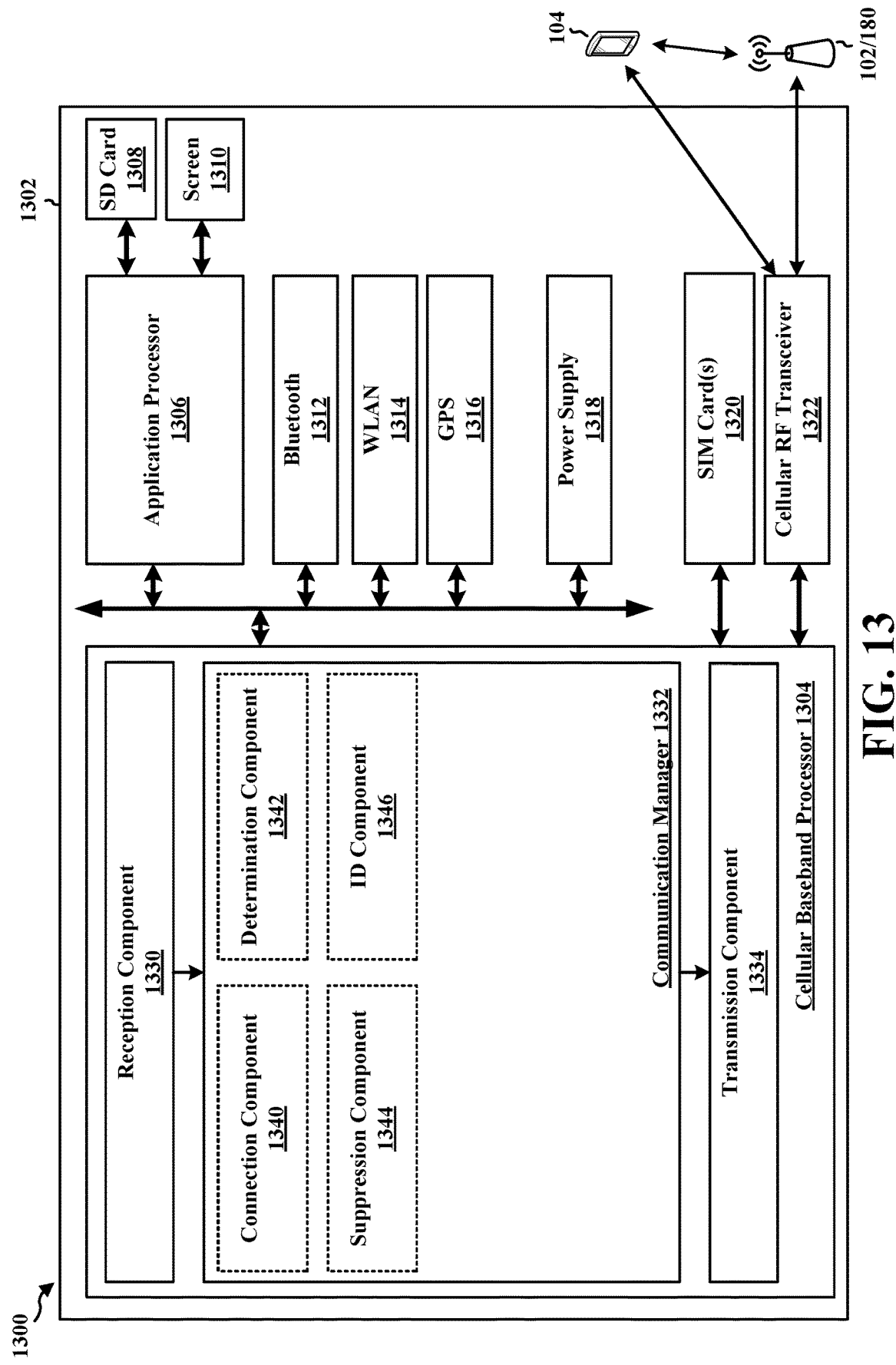
FIG. 13 is a diagram illustrating an example of a hardware implementation for an example apparatus.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the aforediscussed additional modules of the apparatus 1302.

The communication manager 1332 includes a connection component 1340 that is configured to establish a connection with a second wireless device, e.g., as described in connection with 1202 of FIG. 12. The communication manager 1332 further includes a determination component 1342 that is configured to determine to change the ID of the first wireless device, e.g., as described in connection with 1204 of FIG. 12. The communication manager 1332 further includes a suppression component 1344 that is configured to receive an indication to suppress the change of the ID of the first wireless device, e.g., as described in connection with 1206 of FIG. 12. The suppression component 1344 may be configured to receive, from a third wireless device, an indication to suppress the change of the ID of the first wireless device, e.g., as described in connection with 1208 of FIG. 12. The suppression component 1344 may be configured to initiate a suppression of a change of the ID of the first wireless device, e.g., as described in connection with 1210 of FIG. 12. The suppression component 1344 may be configured to terminate the suppression to the change of the ID of the first wireless device, e.g., as described in connection with 1212 of FIG. 12. The communication manager 1332 further includes an ID component 1346 that is configured to change the ID of the first wireless device, e.g., as described in connection with 1214 of FIG. 12. The ID component 1346 may be configured to receive a message targeted to a previous ID of the first wireless device, e.g., as described in connection with 1216 of FIG. 12. The ID component 1346 may be configured to transmit a new ID indication indicating the change of the ID of the first wireless device to a new ID, e.g., as described in connection with 1218 of FIG. 12. The ID component 1346 may be configured to receive a new message targeted to the new ID of the first wireless device, e.g., as described in connection with 1220 of FIG. 12.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for establishing a connection with a second wireless device using a side link. An ID of the first wireless device is provided to the second wireless device. The apparatus includes means for determining to change the ID of the first wireless device based on a predetermined schedule. The apparatus includes means for initiating a suppression of a change of the ID of the first wireless device to maintain the connection with the second wireless device. The apparatus further includes means for receiving, from the second wireless device, an indication to suppress the change of the ID of the first wireless device. The apparatus further includes means for receiving, from a third wireless device, an indication to suppress the change of the ID of the first wireless device. The apparatus further includes means for terminating the suppression to the change of the ID of the first wireless device. The apparatus further includes means for changing the ID of the first wireless device. The means for terminating the suppression to the change of the ID of the first wireless device is configured to receive, from the second wireless device or a third wireless device, a termination indication to terminate the suppression to the change of the ID of the first wireless device. The apparatus further includes means for receiving, from the second wireless device, a message targeted to a previous ID of the first wireless device after the changing the ID of the first wireless device. The first wireless device accepts the message. The apparatus further includes means for transmitting, to the second wireless device, a new ID indication indicating the change of the ID of the first wireless device to a new ID. The apparatus further includes means for receiving, from the second wireless device, a new message targeted to the new ID of the first wireless device. The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
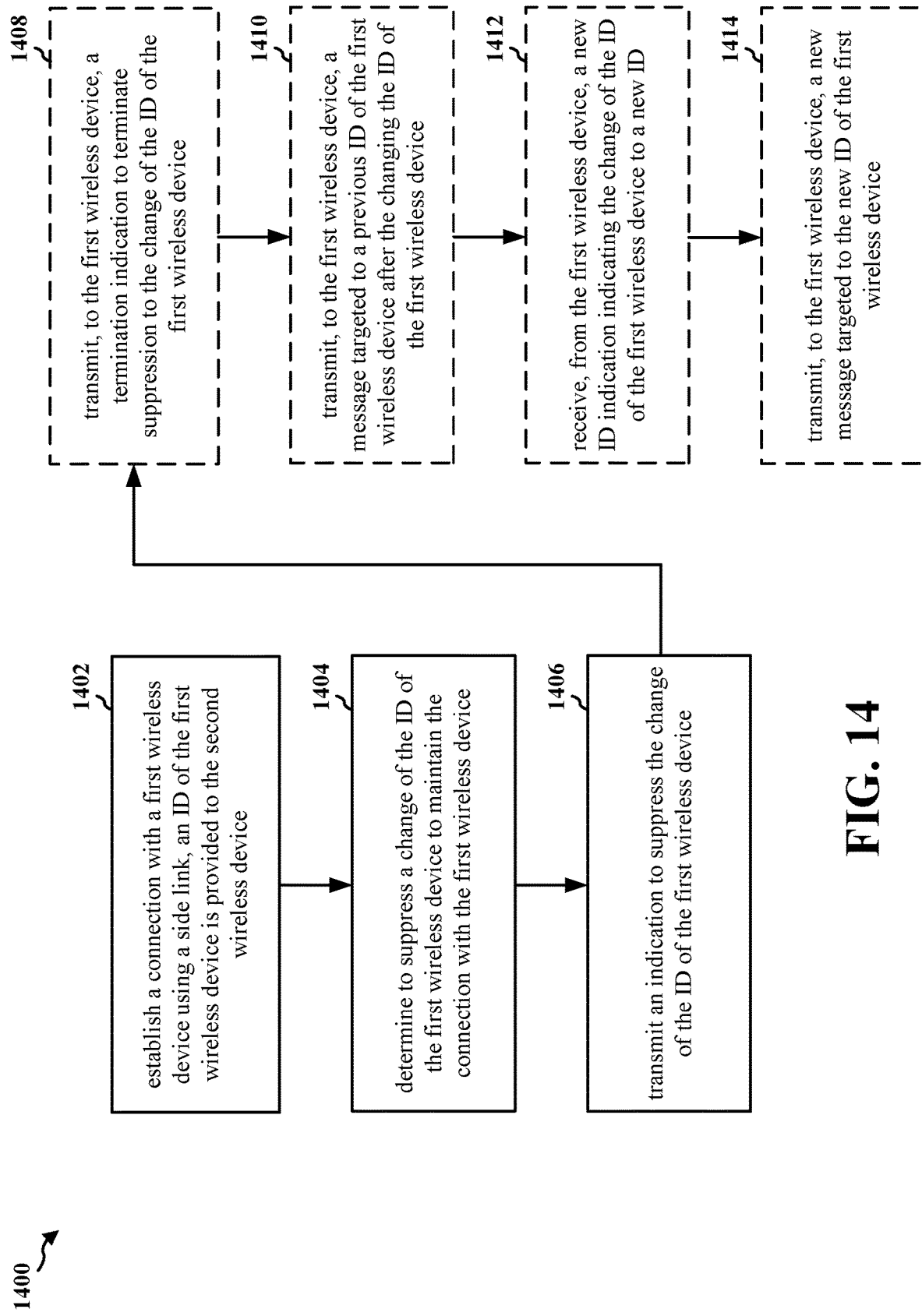
FIG. 14 is a flowchart of a method of wireless communication.

FIG. 14 is a flowchart 1400 of a method of wireless communication. The method may be performed by a UE or a component of a UE (e.g., the UE 104; the apparatus 1502; the cellular baseband processor 1504, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may allow a second wireless device to instruct a first wireless device to suppress or delay the changing of the ID of the first wireless device to maintain a connection between the first and second wireless devices.

At 1402, the second wireless device may establish a connection with a first wireless device. For example, 1402 may be performed by connection component 1540 of apparatus 1502. The second wireless device may establish the connection with the first wireless device using a side link. An ID of the first wireless device may be provided to the second wireless device. The ID of the first wireless device may be provided to the second wireless device during a procedure to establish the connection. In the context of FIG. 6, the first wireless device UE1 602, at 608, establishes a connection with the second wireless device UE2 604. The ID of the first wireless device UE1 602 may be provided to the second wireless device UE2 604 during the procedure to establish the connection with the second wireless device UE2 604.

At 1404, the second wireless device may determine to suppress a change of the ID of the first wireless device. For example, 1404 may be performed by determination component 1542 of apparatus 1502. The second wireless device may determine to suppress the change of the ID of the first wireless device to maintain the connection with the first wireless device. The first wireless device may change its ID based on a predetermined schedule, and suppression of the changing of the ID of the first wireless device may allow the connection between the second wireless device and the first wireless device to be maintained as a persistent connection.

At 1406, the second wireless device may transmit an indication to suppress the change of the ID of the first wireless device. For example, 1406 may be performed by suppression component 1544 of apparatus 1502. The second wireless device may transmit the indication to suppress the change of the ID of the first wireless device to the first wireless device. In the context of FIG. 6, the second wireless device UE2 604 may send a message, at 616, to the first wireless device UE1 602. The message 616 may include an ID suppression configuration that comprises an indication to suppress the change of the ID of the first wireless device. In some aspects, the second wireless device may initiate suppression to the change of the ID of the first wireless device in response to reception of an MSCM from the first wireless device.

In some aspects, for example at 1408, the second wireless device may transmit a termination indication to the first wireless device. For example, 1408 may be performed by suppression component 1544 of apparatus 1502. The second wireless device may transmit, to the first wireless device, the termination indication to terminate suppression to the change of the ID of the first wireless device. In some aspects, the termination indication may provide a suppression duration. For example, the termination indication may be transmitted by the second wireless device within an indication to initiate the suppression to the change of the ID. In some aspects, the termination indication may be transmitted, by the second wireless device to the first wireless device, in a separate transmission after the indication to initiate the suppression to the change of the ID. In the context of FIG. 6, the second wireless device UE2 604 may transmit the termination indication within the message 622. The message 622 may include the suppression ID configuration which may provide instructions to start and terminate the suppression of the change of the ID of the first wireless device. In some aspects, the second wireless device may terminate the suppression to the change of the ID of the first wireless device based on an occurrence of an event. In some aspects, the termination of the suppression to the change of the ID of the first wireless device may be triggered in response to transmission or reception of an MSCM message having a maneuver reservation. The termination of the suppression to the change of the ID may occur upon execution of a maneuver associated with the maneuver reservation.

In some aspects, for example at 1410, the second wireless device may transmit a message targeted to a previous ID of the first wireless device after the changing of the ID of the first wireless device. For example, 1410 may be performed by ID component 1546 of apparatus 1502. The second wireless device may transmit, to the first wireless device, the message targeted to the previous ID of the first wireless device after the ID of the first wireless device has changed. In the context of FIG. 6, the second wireless device UE2 604 may transmit the message 630 that is addressed to the previous ID of the first wireless device UE1 602. The first wireless device UE1 602 may accept the message 630 that is sent or targeted to the previous ID of the first wireless device UE1 602. The first wireless device may accept the message targeted to the previous ID for an accepting period. In some aspects, the accepting period may be based at least on one of a length of time, a time instance, or based on an occurrence of an event. In some aspects, the accepting period may start when a maneuver request is sent or received by the second wireless device. The accepting period may end upon execution of a maneuver associated with the maneuver request. In some aspects, the first wireless device accepts the message targeted to the previous ID of the first wireless device from the second wireless device based on the second wireless device having a connection with the first wireless device while the ID of the first wireless device was the previous ID.

In some aspects, for example at 1412, the second wireless device may receive a new ID indication indicating the change of the ID of the first wireless device to a new ID. For example, 1412 may be performed by ID component 1546 of apparatus 1502. The second wireless device may receive the new ID indication from the first wireless device. In the context of FIG. 6, the second wireless device UE2 604 may receive, at 636, an indication of a new ID from the first wireless device UE1 602. In some aspects, the new ID indication may be received by the second wireless device based on the second wireless device having an active connection with the first wireless device prior to the change of the ID of the first wireless device.

In some aspects, for example at 1414, the second wireless device may transmit a message targeted to the new ID of the first wireless device. For example, 1414 may be performed by ID component 1546 of apparatus 1502. The second wireless device may transmit, to the first wireless device, the message targeted to the new ID of the first wireless device. In the context of FIG. 6, the second wireless device UE2 604 may transmit, at 638, a message to the first wireless device UE1 602 addressed to a new ID of the first wireless device UE1 602.

Figure 15:
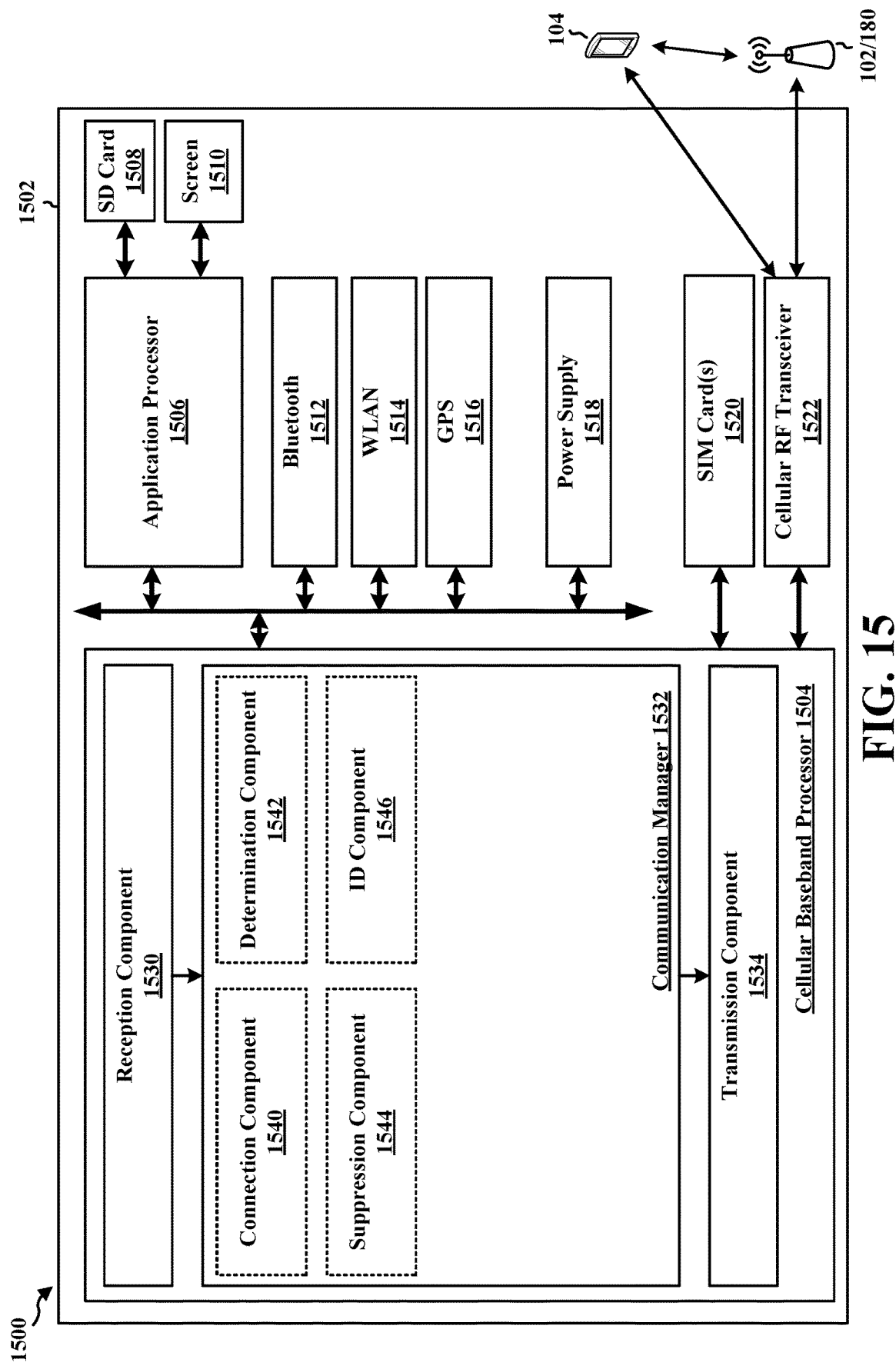
FIG. 15 is a diagram illustrating an example of a hardware implementation for an example apparatus.

FIG. 15 is a diagram 1500 illustrating an example of a hardware implementation for an apparatus 1502. The apparatus 1502 is a UE and includes a cellular baseband processor 1504 (also referred to as a modem) coupled to a cellular RF transceiver 1522 and one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the aforediscussed additional modules of the apparatus 1502.

The communication manager 1532 includes a connection component 1540 that is configured to establish a connection with a first wireless device, e.g., as described in connection with 1402 of FIG. 14. The communication manager 1532 further includes a determination component 1542 that is configured to determine to suppress a change of the ID of the first wireless device, e.g., as described in connection with 1404. The communication manager 1532 further includes a suppression component 1544 that is configured to transmit an indication to suppress the change of the ID of the first wireless device, e.g., as described in connection with 1406 of FIG. 14. The suppression component 1544 may be configured to transmit a termination indication to the first wireless device, e.g., as described in connection with 1408 of FIG. 14. The communication manager 1532 includes an ID component 1546 that is configured to transmit a message targeted to a previous ID of the first wireless device after the changing of the ID of the first wireless device, e.g., as described in connection with 1410 of FIG. 14. The ID component 1546 may be configured to receive a new ID indication indicating the change of the ID of the first wireless device to a new ID, e.g., as described in connection with 1412 of FIG. 14. The ID component 1546 may be configured to transmit a message targeted to the new ID of the first wireless device, e.g., as described in connection with 1414 of FIG. 14.

The apparatus may include additional components that perform each of the blocks of the algorithm in the aforementioned flowchart of FIG. 14. As such, each block in the aforementioned flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the cellular baseband processor 1504, includes means for establishing a connection with a first wireless device using a side link. An ID of the first wireless device is provided to the second wireless device. The apparatus includes means for determining to suppress a change of the ID of the first wireless device to maintain the connection with the first wireless device. The apparatus includes means for transmitting an indication to suppress the change of the ID of the first wireless device. The apparatus further includes means for transmitting, to the first wireless device, a termination indication to terminate suppression to the change of the ID of the first wireless device. The apparatus further includes means for transmitting, to the first wireless device, a message targeted to a previous ID of the first wireless device after the changing the ID of the first wireless device. The first wireless device accepts the message targeted to the previous ID for an accepting period. The apparatus further includes means for receiving, from the first wireless device, a new ID indication indicating the change of the ID of the first wireless device to a new ID. The apparatus further includes means for transmitting, to the first wireless device, a new message targeted to the new ID of the first wireless device. The new ID indication is transmitted to the second wireless device based on the second wireless device having an active connection with the first wireless device prior to the change of the ID of the first wireless device. The aforementioned means may be one or more of the aforementioned components of the apparatus 1502 configured to perform the functions recited by the aforementioned means. As described supra, the apparatus 1502 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a first wireless device comprising establishing a connection with a second wireless device using a side link, wherein an ID of the first wireless device is provided to the second wireless device; determining to change the ID of the first wireless device based on a predetermined schedule; and initiating a suppression of a change of the ID of the first wireless device to maintain the connection with the second wireless device.

In Aspect 2, the method of Aspect 1 further includes that the first wireless device initiates the suppression to the change of the ID of the first wireless device.

In Aspect 3, the method of Aspect 1 or 2 further includes that the first wireless device initiates the suppression to the change of the ID of the first wireless device in response to transmission of an MSCM to at least the second wireless device.

In Aspect 4, the method of any of Aspects 1-3 further includes receiving, from the second wireless device, an indication to suppress the change of the ID of the first wireless device.

In Aspect 5, the method of any of Aspects 1-4 further includes receiving, from a third wireless device, an indication to suppress the change of the ID of the first wireless device.

In Aspect 6, the method of any of Aspects 1-5 further includes terminating the suppression to the change of the ID of the first wireless device; and changing the ID of the first wireless device.

In Aspect 7, the method of any of Aspects 1-6 further includes that the terminating the suppression to the change of the ID of the first wireless device further includes receiving, from the second wireless device or a third wireless device, a termination indication to terminate the suppression to the change of the ID of the first wireless device.

In Aspect 8, the method of any of Aspects 1-7 further includes that the termination indication provides a suppression duration, wherein the termination indication is received within an indication to initiate the suppression to the change of the ID or is received in a separate transmission after the indication to initiate the suppression to the change of the ID.

In Aspect 9, the method of any of Aspects 1-8 further includes that the first wireless device terminates the suppression to the change of the ID of the first wireless device based on an occurrence of an event.

In Aspect 10, the method of any of Aspects 1-9 further includes that the termination of the suppression to the change of the ID of the first wireless device is triggered in response to transmission or reception of an MSCM message having a maneuver reservation, wherein termination of the suppression to the change of the ID occurs upon execution of a maneuver associated with the maneuver reservation.

In Aspect 11, the method of any of Aspects 1-10 further includes receiving, from the second wireless device, a message targeted to a previous ID of the first wireless device after the changing the ID of the first wireless device, wherein the first wireless device accepts the message.

In Aspect 12, the method of any of Aspects 1-11 further includes that the first wireless device accepts the message targeted to the previous ID of the first device for an accepting period and messages targeted to a new ID during the accepting period, wherein the accepting period is based at least on one of a length of time, a time instance, or based on an occurrence of an event.

In Aspect 13, the method of any of Aspects 1-12 further includes that the accepting period starts when a maneuver request is sent or received by the first wireless device, and wherein the accepting period ends upon execution of a maneuver associated with the maneuver request.

In Aspect 14, the method of any of Aspects 1-13 further includes that the first wireless device stops accepting the message targeted to the previous ID upon termination of the accepting period.

In Aspect 15, the method of any of Aspects 1-14 further includes that the first wireless device accepts the message targeted to the previous ID of the first wireless device from the second wireless device based on the second wireless device having a connection with the first wireless device while the ID of the first wireless device was the previous ID.

In Aspect 16, the method of any of Aspects 1-15 further includes transmitting, to the second wireless device, a new ID indication indicating the change of the ID of the first wireless device to a new ID; and receiving, from the second wireless device, a new message targeted to the new ID of the first wireless device.

In Aspect 17, the method of any of Aspects 1-16 further includes that the new ID indication is transmitted to the second wireless device based on the second wireless device having an active connection with the first wireless device prior to the change of the ID of the first wireless device.

Aspect 18 is a device including one or more processors and one or more memories in electronic communication with the one or more processors and storing instructions executable by the one or more processors to cause the device to implement a method as in any of Aspects 1-17.

Aspect 19 is a system or apparatus including means for implementing a method or realizing an apparatus as in any of Aspects 1-17.

Aspect 20 is a non-transitory computer readable storage medium storing instructions executable by one or more processors to cause the one or more processors to implement a method as in any of Aspect 1-17.

Aspect 21 is a method of wireless communication at a second wireless device comprising establishing a connection with a first wireless device using a side link, wherein an ID of the first wireless device is provided to the second wireless device; determining to suppress a change of the ID of the first wireless device to maintain the connection with the first wireless device; and transmitting an indication to suppress the change of the ID of the first wireless device.

In Aspect 22, the method of Aspect 21 further includes that the second wireless device initiates suppression to the change of the ID of the first wireless device in response to reception of an MSCM from the first wireless device.

In Aspect 23, the method of Aspect 21 or 22 further includes transmitting, to the first wireless device, a termination indication to terminate suppression to the change of the ID of the first wireless device.

In Aspect 24, the method of any of Aspects 21-23 further includes that the termination indication provides a suppression duration, wherein the termination indication is transmitted within an indication to initiate the suppression to the change of the ID or is received in a separate transmission after the indication to initiate the suppression to the change of the ID.

In Aspect 25, the method of any of Aspects 21-24 further includes that the second wireless device terminates the suppression to the change of the ID of the first wireless device based on an occurrence of an event.

In Aspect 26, the method of any of Aspects 21-25 further includes that the termination of the suppression to the change of the ID of the first wireless device is triggered in response to transmission or reception of an MSCM message having a maneuver reservation, wherein termination of the suppression to the change of the ID occurs upon execution of a maneuver associated with the maneuver reservation.

In Aspect 27, the method of any of Aspects 21-26 further includes transmitting, to the first wireless device, a message targeted to a previous ID of the first wireless device after the changing the ID of the first wireless device, wherein the first wireless device accepts the message targeted to the previous ID for an accepting period.

In Aspect 28, the method of any of Aspects 21-27 further includes that the accepting period is based at least on one of a length of time, a time instance, or based on an occurrence of an event.

In Aspect 29, the method of any of Aspects 21-28 further includes that the accepting period starts when a maneuver request is sent or received by the second wireless device, and wherein the accepting period ends upon execution of a maneuver associated with the maneuver request.

In Aspect 30, the method of any of Aspects 21-29 further includes that the first wireless device accepts the message targeted to the previous ID of the first wireless device from the second wireless device based on the second wireless device having a connection with the first wireless device while the ID of the first wireless device was the previous ID.

In Aspect 31, the method of any of Aspects 21-30 further includes receiving, from the first wireless device, a new ID indication indicating the change of the ID of the first wireless device to a new ID; and transmitting, to the first wireless device, a new message targeted to the new ID of the first wireless device, wherein the new ID indication is transmitted to the second wireless device based on the second wireless device having an active connection with the first wireless device prior to the change of the ID of the first wireless device.

Aspect 32 Aspect 14 is a device including one or more processors and one or more memories in electronic communication with the one or more processors and storing instructions executable by the one or more processors to cause the device to implement a method as in any of Aspects 21-31.

Aspect 33 is a system or apparatus including means for implementing a method or realizing an apparatus as in any of Aspects 21-31.

Aspect 34 is a non-transitory computer readable storage medium storing instructions executable by one or more processors to cause the one or more processors to implement a method as in any of Aspect 21-31.

What is claimed is:

1. An apparatus for wireless communication at a first wireless device, comprising:
   a memory; and
   at least one processor coupled to the memory and configured to:
      establish a connection with a second wireless device using a side link, wherein an identifier (ID) of the first wireless device is provided to the second wireless device;
      determine to change the ID of the first wireless device based on a predetermined schedule; and
      initiate a suppression of a change of the ID of the first wireless device to maintain the connection with the second wireless device, wherein the first wireless device initiates the suppression to the change of the ID of the first wireless device in response to transmission of a maneuver sharing and coordinating message (MSCM) to at least the second wireless device.

2. The apparatus of claim 1, wherein the at least one processor is further configured to:
   receive, from the second wireless device, an indication to suppress the change of the ID of the first wireless device.

3. The apparatus of claim 1, wherein the at least one processor is further configured to:
   receive, from a third wireless device, an indication to suppress the change of the ID of the first wireless device.

4. The apparatus of claim 1, wherein the at least one processor is further configured to:
   terminating the suppression to the change of the ID of the first wireless device; and
   changing the ID of the first wireless device.

5. The apparatus of claim 4, wherein to terminate the suppression to the change of the ID of the first wireless device, the at least one processor is configured to:
   receive, from the second wireless device or a third wireless device, a termination indication to terminate the suppression to the change of the ID of the first wireless device.

6. The apparatus of claim 5, wherein the termination indication provides a suppression duration, wherein the termination indication is received within an indication to initiate the suppression to the change of the ID or is received in a separate transmission after the indication to initiate the suppression to the change of the ID.

7. The apparatus of claim 4, wherein the first wireless device terminates the suppression to the change of the ID of the first wireless device based on an occurrence of an event.

8. The apparatus of claim 4, wherein the termination of the suppression to the change of the ID of the first wireless device is triggered in response to transmission or reception of a maneuver sharing and coordinating message (MSCM) message having a maneuver reservation, wherein termination of the suppression to the change of the ID occurs upon execution of a maneuver associated with the maneuver reservation.

9. The apparatus of claim 4, wherein the at least one processor is further configured to:
   receive, from the second wireless device, a message targeted to a previous ID of the first wireless device after the changing the ID of the first wireless device, wherein the first wireless device accepts the message.

10. The apparatus of claim 9, wherein the first wireless device accepts the message targeted to the previous ID of the first wireless device for an accepting period and messages targeted to a new ID during the accepting period, wherein the accepting period is based at least on one of a length of time, a time instance, or based on an occurrence of an event.

11. The apparatus of claim 10, wherein the accepting period starts when a maneuver request is sent or received by the first wireless device, and wherein the accepting period ends upon execution of a maneuver associated with the maneuver request.

12. The apparatus of claim 10, wherein the first wireless device stops accepting the message targeted to the previous ID upon termination of the accepting period.

13. The apparatus of claim 9, wherein the first wireless device accepts the message targeted to the previous ID of the first wireless device from the second wireless device based on the second wireless device having a connection with the first wireless device while the ID of the first wireless device was the previous ID.

14. The apparatus of claim 4, wherein the at least one processor is further configured to:
   transmit, to the second wireless device, a new ID indication indicating the change of the ID of the first wireless device to a new ID; and
   receive, from the second wireless device, a new message targeted to the new ID of the first wireless device.

15. The apparatus of claim 14, wherein the new ID indication is transmitted to the second wireless device based on the second wireless device having an active connection with the first wireless device prior to the change of the ID of the first wireless device.

16. A method of wireless communication at a first wireless device, comprising:
   establishing a connection with a second wireless device using a side link, wherein an identifier (ID) of the first wireless device is provided to the second wireless device;
   determining to change the ID of the first wireless device based on a predetermined schedule; and
   initiating a suppression to change of the ID of the first wireless device to maintain the connection with the second wireless device, wherein the first wireless device initiates the suppression to the change of the ID of the first wireless device in response to transmission of a maneuver sharing and coordinating message (MSCM) to at least the second wireless device.

17. An apparatus of wireless communication at a second wireless device, comprising:
   a memory; and
   at least one processor coupled to the memory and configured to:

establish a connection with a first wireless device using a side link, wherein an identifier (ID) of the first wireless device is provided to the second wireless device;

determine to suppress a change of the ID of the first wireless device to maintain the connection with the first wireless device; and transmit an indication to suppress the change of the ID of the first wireless device, wherein the second wireless device initiates suppression to the change of the ID of the first wireless device in response to reception of a maneuver sharing and coordinating message (MSCM) from the first wireless device.

18. The apparatus of claim 17, wherein the at least one processor is further configured to:

transmit, to the first wireless device, a termination indication to terminate suppression to the change of the ID of the first wireless device.

19. The apparatus of claim 18, wherein the termination indication provides a suppression duration, wherein the termination indication is transmitted within an indication to initiate the suppression to the change of the ID or is received in a separate transmission after the indication to initiate the suppression to the change of the ID.

20. The apparatus of claim 18, wherein the second wireless device terminates the suppression to the change of the ID of the first wireless device based on an occurrence of an event.

21. The apparatus of claim 18, wherein the termination of the suppression to the change of the ID of the first wireless device is triggered in response to transmission or reception of a maneuver sharing and coordinating message (MSCM) message having a maneuver reservation, wherein termination of the suppression to the change of the ID occurs upon execution of a maneuver associated with the maneuver reservation.

22. The apparatus of claim 18, wherein the at least one processor is further configured to:

transmit, to the first wireless device, a message targeted to a previous ID of the first wireless device after the changing the ID of the first wireless device, wherein the first wireless device accepts the message targeted to the previous ID for an accepting period.

23. The apparatus of claim 22, wherein the accepting period is based at least on one of a length of time, a time instance, or based on an occurrence of an event.

24. The apparatus of claim 22, wherein the accepting period starts when a maneuver request is sent or received by the second wireless device, and wherein the accepting period ends upon execution of a maneuver associated with the maneuver request.

25. The apparatus of claim 22, wherein the first wireless device accepts the message targeted to the previous ID of the first wireless device from the second wireless device based on the second wireless device having a connection with the first wireless device while the ID of the first wireless device was the previous ID.

26. The apparatus of claim 18, wherein the at least one processor is further configured to:

receive, from the first wireless device, a new ID indication indicating the change of the ID of the first wireless device to a new ID; and transmit, to the first wireless device, a new message targeted to the new ID of the first wireless device, wherein the new ID indication is transmitted to the second wireless device based on the second wireless device having an active connection with the first wireless device prior to the change of the ID of the first wireless device.

27. A method of wireless communication at a second wireless device, comprising:

establishing a connection with a first wireless device using a side link, wherein an identifier (ID) of the first wireless device is provided to the second wireless device;

determining to suppress a change of the ID of the first wireless device to maintain the connection with the first wireless device; and transmitting an indication to suppress the change of the ID of the first wireless device, wherein the second wireless device initiates suppression to the change of the ID of the first wireless device in response to reception of a maneuver sharing and coordinating message (MSCM) from the first wireless device.

* * * * *